UNITED STATES PATENT OFFICE.

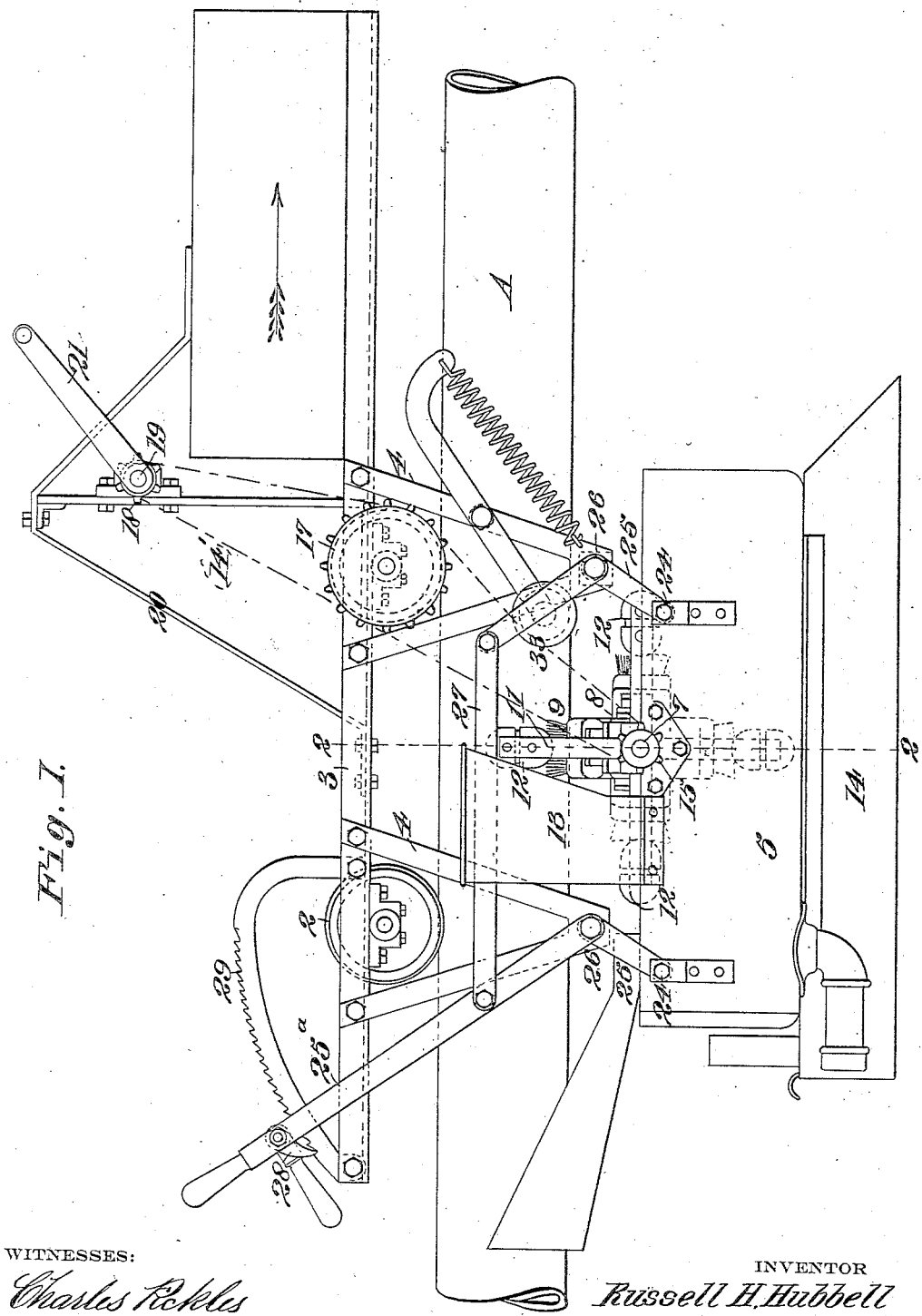

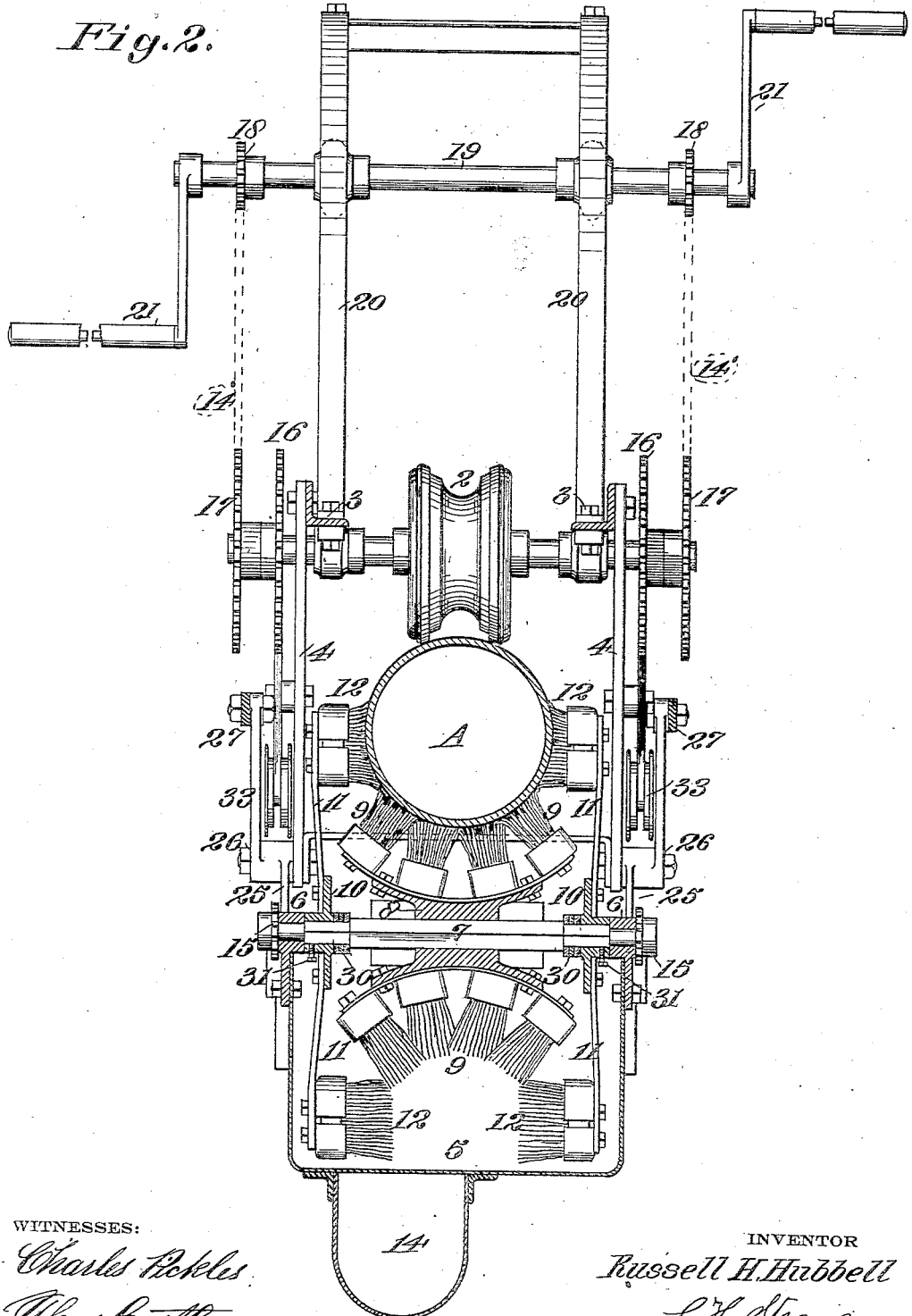

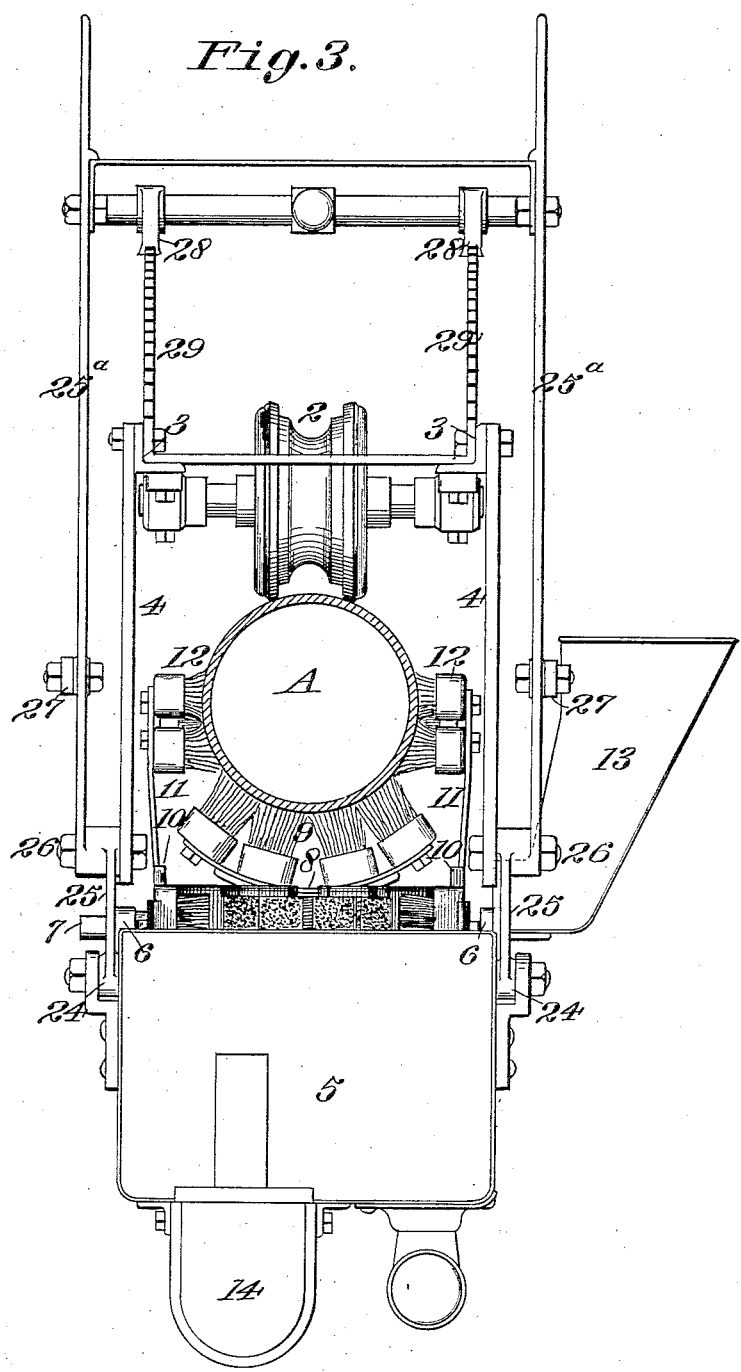

RUSSELL H. HUBBELL, OF SAN FRANCISCO, CALIFORNIA, ASSIGNOR TO HILL, HUBBELL & CO., OF SAN FRANCISCO, CALIFORNIA, A FIRM.

PIPE-PAINTING MACHINE.

1,159,676.

Specification of Letters Patent.  Patented Nov. 9, 1915.

Application filed January 20, 1915.  Serial No. 3,231.

*To all whom it may concern:*

Be it known that I, RUSSELL H. HUBBELL, a citizen of the United States, residing in the city and county of San Francisco and State of California, have invented new and useful Improvements in Pipe-Painting Machines, of which the following is a specification.

This invention relates to a pipe painting machine.

The object of the present invention is to provide a simple, compact, easily operated machine of the character described for painting or coating pipe lines; and particularly to provide a machine which is adapted to coat the bottom and sides of the pipe with a bitumastic composition.

Further objects will hereinafter appear.

The invention consists of the parts and the construction and combination of parts as hereinafter more fully described and claimed, having reference to the accompanying drawings in which—

Figure 1 is a side elevation showing the application of the invention. Fig. 2 is a cross section on line 2—2, Fig. 1. Fig. 3 is an end view of Fig. 1.

A indicates the pipe line to be painted or coated. Adapted to be supported by rollers 2 and moved along the pipe by a driving mechanism hereinafter to be described is a carriage 3, and suspended from the carriage, by hangers 4, and positioned centrally below the pipe is a rectangular shaped tank 5. Journaled crosswise of the tank, in bearings 6, is a shaft 7, and secured on the shaft centrally between the bearings is a hub member which is shaped to form a support for a plurality of arms 8, upon each of which is secured a plurality of brushes 9; there being in this instance four arms and four brushes on each arm. Secured on the ends of the shaft, inside of the tank, is a pair of flanged collars 10, and secured to each of said flanged collars is a plurality of radially disposed spring arms 11, on the outer ends of which are secured brushes 12; there being in this instance four arms on each collar and one brush on each arm. The brushes may be attached to their respective arms in any suitable manner and their quality and size may be varied to suit different conditions and coating materials handled.

The present machine is particularly constructed to coat pipes of large diameter with a bitumastic composition. This material is preferably first heated and is then poured into the tank through a hopper 13 suitably secured on the side of the tank. The material is then picked up by the brushes and applied to the bottom and sides of the pipe.

A coating material of a bitumastic base has a tendency to set or harden very quickly. This is, however, overcome in the present instance by providing a heater 14 which maintains a sufficiently high temperature to keep the contents of the tank in a fluid-like condition. It is further prevented from hardening as the revolving brushes create considerable agitation.

Revolving movement is transmitted to shaft 7, upon which the several brushes are mounted, through chains 14, indicated by dotted lines, and sprocket gears 15—15, 16—16, 17—17 and 18—18 from shaft 19 journaled in an upright frame 20 mounted on the carriage; shaft 19 being driven from any suitable source of power or, as here shown, by cranks 21. There are two sets of supporting rollers 2. The forward set being secured on the same shaft as sprocket gears 16 and 17 will consequently be driven by same and will in this manner propel the carriage or machine in a forward direction while the brushes are revolving and applying the coating material. The machine is thus automatically fed or moved in a forward direction as the pipe is coated without any particular attention or effort on the part of the operator.

The present machine is adapted to handle pipes of various sizes or diameters. It is, therefore, necessary to adjust the position of the tank and brushes with relation to the pipe and carriage and this is accomplished as follows: The tank proper is suspended, as at 24, from arms 25 pivotally mounted, as at 26, in the lower ends of hangers 4. The upper ends of arms 25 are connected by links 27 so that they will move in unison, and one of the arms is extended, as at 25ª, to form a lever by which they may be moved or swung about their pivots to raise or lower the tank with relation to the pipe and carriage; the lever being locked in any adjusted position by means of the pawl 28 and rack bar 29. This adjustment permits brushes 9 and arms 8 to be moved or raised into position with relation to a pipe of practically any diameter. The spring arms 11 are also adjustable with relation to the pipe as the flanged collars to which they are secured may be adjusted longitudinally on the shaft by removing or adding washers 30; the collars being secured in position by screws 31. Any slack in the chain caused by changing the position of the tank is in this instance automatically taken up by the spring-actuated idler indicated at 33.

A machine constructed as here shown is simple and substantial in construction and is cheaply and easily operated as the only adjustment necessary is that of the brushes and supply tank. The machine is operated by two men, one turning the right-hand crank 21 and the other the left-hand crank. Power is in this manner transmitted to revolve the brushes and propel the carriage in a forward direction at the same time. The bottom and sides of the pipe are thus quickly and thoroughly covered with the bitumastic composition, or like material, with the expenditure of little effort or skill on the part of the operator.

The materials and finish of the several parts of the machine are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A device of the character described comprising a carriage supported by rollers on a pipe, a tank suspended from the carriage below the pipe, said tank adapted to contain the material with which the pipe is to be coated, a shaft journaled crosswise of the tank, a brush supporting member secured on said shaft having a plurality of brushes mounted thereon adapted to engage the bottom side of the pipe, a plurality of radially disposed spring arms carried near each end of the shaft having brushes secured on their outer ends engageable with the sides of the pipe, means for revolving the shaft to bring the brushes successively into engagement with the pipe, and means for propelling the carriage along the pipe.

2. A device of the character described comprising a carriage supported by rollers on a pipe, a tank suspended from the carriage below the pipe, said tank adapted to contain the material with which the pipe is to be coated, a shaft journaled cross wise of the tank, a brush supporting member secured on said shaft having a plurality of brushes mounted thereon adapted to engage the bottom side of the pipe, a plurality of radially disposed arms carried near each end of the shaft having brushes secured on their outer ends engageable with the sides of the pipe, means for revolving the shaft to bring the brushes successively into engagement with the pipe, means for propelling the carriage along the pipe, and means for raising or lowering the tank with relation to the pipe and carriage.

3. A device of the character described comprising a carriage supported by rollers on a pipe, a tank suspended from the carriage below the pipe, said tank adapted to contain the material with which the pipe is to be coated, a shaft journaled crosswise of the tank, a brush supporting member secured on said shaft having a plurality of brushes mounted thereon adapted to engage the bottom side of the pipe, a plurality of radially disposed arms carried near each end of the shaft having brushes secured on their outer ends engageable with the sides of the pipe, said side brushes adapted to form a continuation of the bottom brushes, means for adjusting said arms longitudinally on the shaft, means for revolving the shaft to bring the brushes successively into engagement with the pipe, and means for propelling the carriage along the pipe.

4. A device of the character described comprising a carriage supported by rollers on a pipe, a tank suspended from the carriage below the pipe, said tank adapted to contain the material with which the pipe is to be coated, a shaft journaled crosswise of the tank, a brush supporting member secured on said shaft having a plurality of brushes mounted thereon adapted to engage the bottom side of the pipe, a plurality of radially disposed arms carried near each end of the shaft having brushes secured on their outer ends engageable with the sides of the pipe, means for adjusting said arms longitudinally on the shaft, means for revolving the shaft to bring the brushes successively into engagement with the pipe, means for propelling the carriage along the pipe, and means for raising and lowering the tank with relation to the pipe and carriage.

5. In a pipe painting machine, the combination of a carriage adapted to travel on a pipe to be painted, said carriage having an underslung paint receptacle beneath the pipe, rotatable means for applying paint from said receptacle to the underside of the pipe, means connecting the carriage with the paint applying means for driving the same in unison, and means for adjusting said paint receptacle without disturbing said driving connection.

6. In a pipe painting machine, the combination of a carriage adapted to travel on a pipe to be painted, an adjustable underslung paint receptacle supported by said carriage beneath the pipe, means for applying paint from said receptacle to the under side of the pipe, said last named means including a rotary brush, and means at all times connecting the carriage with the rotary brush for driving the same in unison.

7. In a pipe painting machine, a carriage adapted to travel on a pipe to be painted, a receptacle below said carriage, links for suspending said receptacle from the carriage, rotatable paint applying means within the receptacle, means for driving the carriage and the paint applying means in unison, and means for swinging said links to adjust the receptacle to and from the carriage.

8. In a pipe painting machine, the combination of a carriage adapted to travel on a pipe to be painted, links supporting said receptacle, and means for moving said links to adjust the receptacle to and from said carriage.

9. In a pipe painting machine, a shaft, a plurality of spring arms carried by said shaft, brushes on said arms, and means for adjusting said arms laterally on the shaft.

10. In a pipe painting machine, a carriage, a paint receptacle carried thereby, means for adjusting said receptacle to and from the carriage, a rotary brush within said receptacle, driving means for rotating said brush and propelling the carriage along the pipe, and means for automatically taking up the slack in said driving means as the receptacle is adjusted.

In testimony whereof I have hereunto set my hand in the presence of two subscribing witnesses.

RUSSELL H. HUBBELL.

Witnesses:
M. V. COLLINS,
H. M. MOORE.